(12) United States Patent
Fossati et al.

(10) Patent No.: US 10,531,522 B2
(45) Date of Patent: Jan. 7, 2020

(54) METHOD FOR ASSEMBLING AN INDUCTION HEATING DEVICE

(71) Applicant: Whirlpool Corporation, Benton Harbor, MI (US)

(72) Inventors: Laura Fossati, Cassinetta (IT); Amandeep Singh, New Delhi (IN); Gabor Papotti, Auckland (NZ)

(73) Assignee: Whirlpool Corporation, Benton Harbor, MI (US)

( * ) Notice: Subject to any disclaimer, the term of this patent is extended or adjusted under 35 U.S.C. 154(b) by 779 days.

(21) Appl. No.: 15/148,621

(22) Filed: May 6, 2016

(65) Prior Publication Data

US 2016/0255682 A1    Sep. 1, 2016

Related U.S. Application Data

(63) Continuation of application No. 13/775,945, filed on Feb. 25, 2013, now Pat. No. 9,370,051.

(51) Int. Cl.
| | |
|---|---|
| *H05B 6/12* | (2006.01) |
| *H01F 41/00* | (2006.01) |
| *H05B 6/36* | (2006.01) |
| *B29C 45/16* | (2006.01) |
| *H05B 1/02* | (2006.01) |
| *B29K 21/00* | (2006.01) |
| *B29L 31/00* | (2006.01) |

(52) U.S. Cl.
CPC .......... *H05B 6/1209* (2013.01); *B29C 45/16* (2013.01); *H01F 41/00* (2013.01); *H05B 1/0266* (2013.01); *H05B 6/1254* (2013.01); *H05B 6/36* (2013.01); *B29K 2021/00* (2013.01); *B29L 2031/779* (2013.01); *H05B 2206/022* (2013.01); *Y02B 40/126* (2013.01); *Y10T 29/4902* (2015.01)

(58) Field of Classification Search
CPC ................ B29C 45/16; B29K 2021/00; B29L 2031/779; H01F 41/00; H05B 1/0266; H05B 2206/022; H05B 6/1209; H05B 6/1254; H05B 6/36; Y02B 40/126; Y10T 29/4902
USPC ....... 219/672, 609, 620, 622, 627, 630, 635, 219/647, 675, 676, 618, 621, 623, 624; 336/60, 205, 223, 232; 29/602.1
See application file for complete search history.

(56) References Cited

U.S. PATENT DOCUMENTS

| | | | | |
|---|---|---|---|---|
| 6,594,885 | B2 * | 7/2003 | Abdel-Tawab | ....... H01F 17/045 264/236 |
| 2007/0278215 | A1 * | 12/2007 | Schilling | .............. H05B 6/1263 219/622 |
| 2010/0206871 | A1 * | 8/2010 | Kataoka | ................. H05B 6/062 219/622 |
| 2011/0100980 | A1 * | 5/2011 | Kitaizumi | ............ H05B 6/1245 219/624 |

(Continued)

*Primary Examiner* — Dana Ross
*Assistant Examiner* — Ket D Dang
(74) *Attorney, Agent, or Firm* — McGarry Bair PC

(57) ABSTRACT

A method for assembling an induction heating device includes the steps of interposing at least one ferrite bar between a coil assembly and a support plate, and snap engaging a central polymeric fastening element on the support plate. At least one end of the ferrite bar is inserted in a radial seat of the central polymeric fastening element. The coil assembly is snap engaged with the central polymeric fastening element in order to sandwich the ferrite bars between the support plate and the coil assembly.

9 Claims, 3 Drawing Sheets

(56) References Cited

U.S. PATENT DOCUMENTS

| | | | | |
|---|---|---|---|---|
| 2011/0163087 A1* | 7/2011 | Wakashima | .............. | F24F 1/06 |
| | | | | 219/630 |
| 2012/0111854 A1* | 5/2012 | Gaspard | ............... | H05B 6/1209 |
| | | | | 219/650 |
| 2012/0223070 A1* | 9/2012 | Matsui | ................. | H05B 6/1254 |
| | | | | 219/677 |

* cited by examiner

METHOD FOR ASSEMBLING AN INDUCTION HEATING DEVICE

CROSS REFERENCE TO RELATED APPLICATIONS

This application is a continuation of U.S. application Ser. No. 13/775,945, filed Feb. 25, 2013, now U.S. Pat. No. 9,370,051, issued Jun. 14, 2016.

TECHNICAL FIELD

The present invention relates to an induction heating device comprising a support plate and a coil assembly, between the coil assembly and the support plate being interposed a plurality of ferrite bars. With the term "ferrite bars" we mean any kind of elongated magnetic field concentrator located beneath the coil assembly.

BACKGROUND

The above heating devices are used to heat and cook food thanks to heat energy generated in a ferromagnetic container placed above the coil assembly and supported on a ceramic glass or the like.

The known induction heating devices consist of a series of layers dedicated to different functions. All of them are composed of different materials and geometries. In some solutions layers are connected with glue. All the parts (with the exception of the support plate, usually made of aluminum) have a hole in the center which is designed to allow the insertion of a sensor holder for a thermal sensor contacting the ceramic glass. On the top of the last layer, i.e. the coil assembly, there is a thermal insulating layer for instance of rock wool. The sequence of the layers, starting from the top is: rock wool>glue>copper coil>glue>mica>glue>ferrite>glue>aluminum base. Mica and copper coil are usually supplied as a single assembly.

Other heating induction devices, for instance as described in EP0713350 and EP1560462, comprise a disk-shaped plastic support interposed between the support plate and the coil assembly and having a plurality of housings for containing the ferrite bars. Also in these solutions glue is used for holding together the different layers.

All the above known solutions present drawbacks, either in view of the extensive use of glue which makes the assembly process quite complex and unreliable in terms of controlled final dimensions, or in view of the increase of cost due to the use of quite complex and large components as the disk-shaped plastic supports. Another problem is linked to the need of having, in an automated assembly process, a reliable and constant thickness of the flat induction heating device, particularly because the quantity of glue cannot always being dosed in a constant manner.

SUMMARY

An aspect of the invention is a method for assembling an induction heating device. The method includes the steps of interposing at least one ferrite bar between a coil assembly and a support plate, and snap engaging a central polymeric fastening element on the support plate. At least one end of the ferrite bar is inserted in a radial seat of the central polymeric fastening element. The coil assembly is snap engaged with the central polymeric fastening element in order to sandwich the ferrite bars between the support plate and the coil assembly.

BRIEF DESCRIPTION OF THE DRAWINGS

Further advantages and features according to the present invention will be clear from the following detailed description, provided as a not limiting example, with reference to the attached drawings, in which.

DETAILED DESCRIPTION

Figure 1:
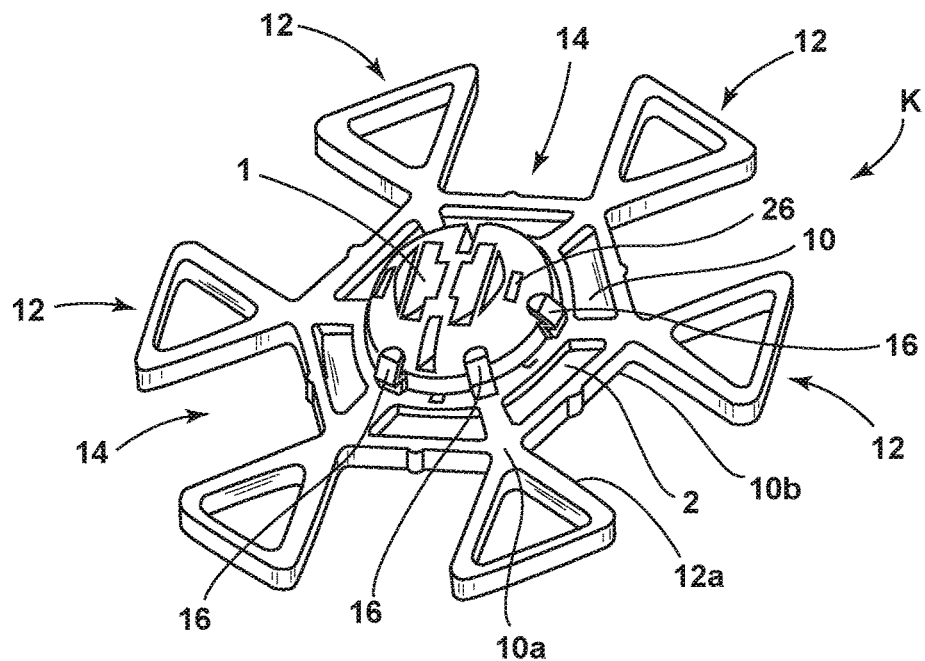
FIG. 1 is a perspective view of a key component of the induction heating device according to the invention.

With reference to the drawings, the induction heating device comprises a central component K composed of a co-injection of two different materials. With reference to FIG. 1, the component K comprises a plastic body 2 of thermoplastic material, on which is co-injected a central part of rubber, the sensor holder 1. The plastic body 2 is made of thermoplastic or thermosetting polymer having a high Young's modulus.

The shape of the component K recalls that of a snowflake, since it comprises a central portion 10 shaped as a regular polygon, for instance an hexagon (where the rubber or similar elastomeric material is centrally co-injected), on whose apexes 10a are integrally formed other regular auxiliary polygons 12, in the shown example triangles.

Figure 4:
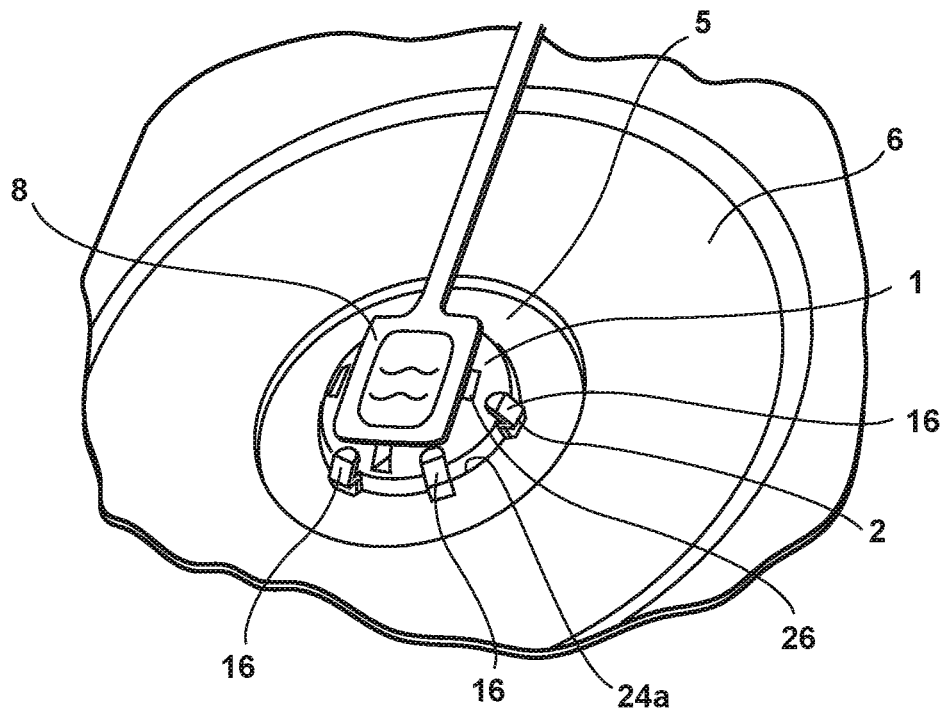
FIG. 4 is an enlarged perspective view of a central portion of the device of FIG. 2, in an assembled configuration.
Figure 7:
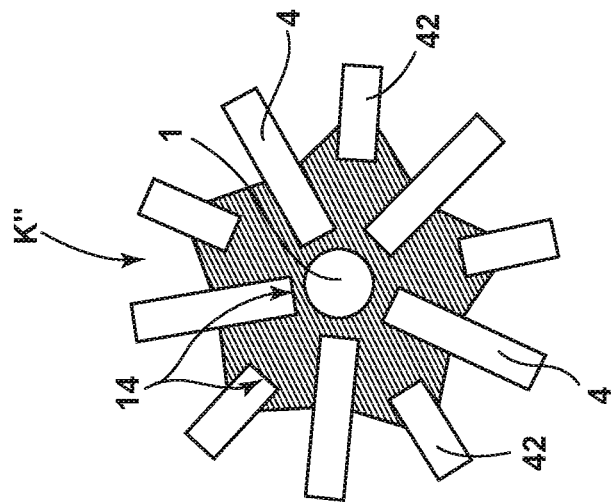
FIGS. 6 and 7 are schematic views similar to FIG. 5 showing different solutions for different layouts for ferrite bars position according to different coil sizes.
Figure 6:
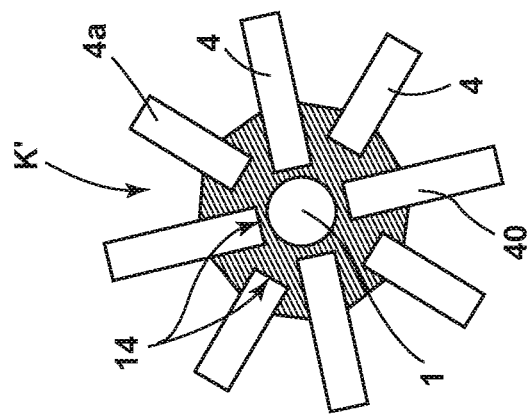

Such shape is due to the main technical purpose of the component K, i.e. to constrain the ends of ferrite bars 4 in the position required to channel or concentrate the electromagnetic field. Between each side 10b of the hexagon defining the central portion 10 of the component K and two facing sides 12a of two adjacent auxiliary triangles 12 it is defined a quadrangular seat 14 (open on top and bottom) for an end 4a of a ferrite bar 4. In the example shown in FIGS. 1, 2 and 4, the central component K defines six seats 14 for the ferrite bars, but of course it can be formed with a different number of seats (as shown in FIGS. 6 and 7). The thickness of the portion 10 corresponds to the thickness of the ferrite bars 4, so that all such components can be sandwiched between other components of the induction heater (as it will be clear from the following description) in a very precise way in terms of final thickness. Moreover, the dimension of the seats 14 (which allows the assembly of the ferrite bars 4 with a predetermined degree of interference), together with the stiffness of the thermoplastic or thermosetting material allows a very stable position of the ferrite bars 4, despite the forces acting on them during normal operation.

The sensor holder 1 is a co-injection of rubber, with a total height slightly higher than the thickness of the central portion 10, because the holder 1 needs to generate a spring effect to keep a sensor 8 (FIGS. 2 and 4) pressed on the bottom face of the glass (not shown) of the induction cooktop.

The central portion 10 of the component K is also provided with a plurality of elastic hooks 16 and 18 which are oriented parallel to the central symmetry axis of the component K. A first crown of upper hooks 16 can be seen in FIGS. 1 and 2, while a second crown of lower hooks 18 can be seen in FIG. 3.

Figure 2:
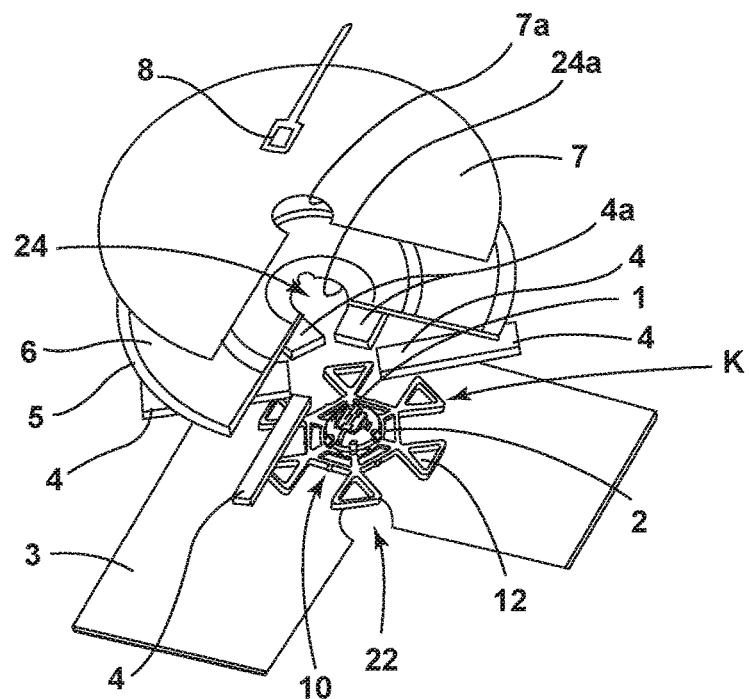
FIG. 2 is an exploded view, partially cross sectioned, of an induction heating device according to the invention, which includes component of FIG. 1.
Figure 3:
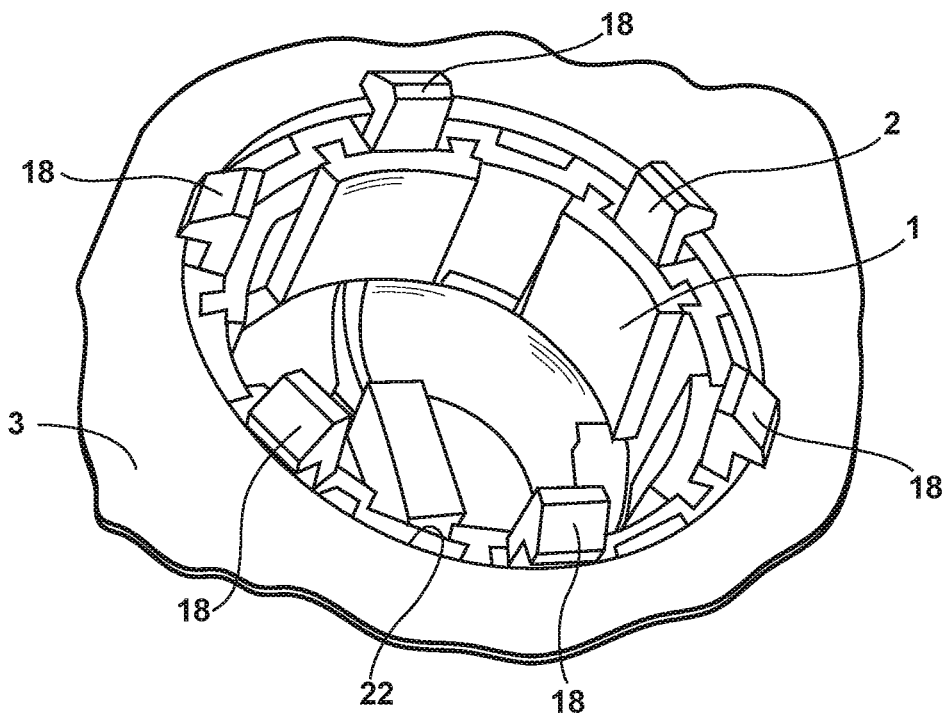
FIG. 3 is a perspective view from the bottom of the induction heating device of FIG. 2, in an assembled configuration.
Figure 5:
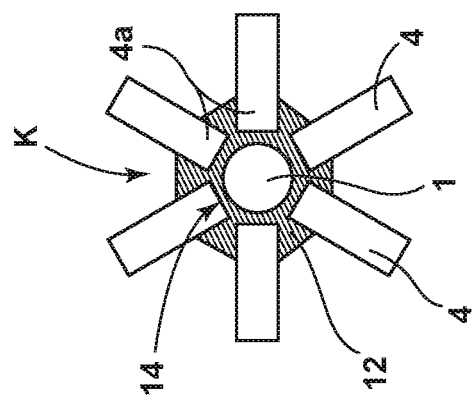
FIG. 5 is a schematic top view of how the key component of FIG. 1 is used for fitting the ferrite bars.

FIG. 2 shows the entire induction heater assembly with the central component K. A copper coil 6 is stuck on a mica layer 5 with glue and they form a single component. The coil is assembled in the following sequence: the central component K is connected to an aluminum base or plate 3 through the lower crown of hooks 18 with a light pressure in order to allow a snap-engaging action of the hooks 18 on a circular edge 22a of a central hole 22 of the base 3 (FIG. 3). The central hole 22 with its edge 22a can be replaced by small slots (not shown) which can be snap-engaged by the lower crowns of hooks 18 for reaching the same technical result. The dimension of the elastic hooks 18 is selected in order to fix in a stable way the component K on the aluminum base 3 without the use of any glue. At this point of the assembly process, the ferrite bars 4 are collocated with interference in the defined seats 14, obtaining a configuration (shown in FIG. 5) in which the ferrite bars 4 are radially centered on the component K as rays of a star. Then the mica layer 5 and the copper coil 6 assembly is positioned on the central component K and with a little pressure (similarly to what already done for the base 3), connected with the upper hooks 16 so that they snap-engage with a circular edge 24a of a central hole 24 of the coil assembly, visible in FIG. 4. The component K is interposed and in contact with the aluminum base 3 and with the coil assembly, particularly with the mica layer 5 thereof.

A thermal insulation layer 7, for instance of rock wool, is then placed on the copper coil 6 and a temperature sensor 8, for instance a NTC sensor, is joined to the central component K through its insertion in corresponding joints 26 (FIG. 4) on the sensor holder 1 of the central component K, so that a mechanical constraint of the rock wool 7 is obtained. The rock wool layer 7 is preferably provided with a central hole 7a so that the sensor 8 is interposed between the sensor holder 1 and the ceramic glass of the induction cooktop.

The embodiment shown in FIG. 6 differs from the above in the different number of ferrite bars (eight instead of six) in order to match a different size of the coil and in the different shape of the central component K' (octagonal and not hexagonal). Moreover the ferrite bars 4 and 40 have two different dimensions, with the longer bars 4 closer to the sensor holder 1.

In the embodiment shown in FIG. 7 (for a coil having a large size) the central component K" has an overall pentagon shape and it is adapted to house ten ferrite bars 4 and 42, also in this case of different length.

The solution according to the invention, independently on which embodiment is used, has many benefits in terms of cost reduction and improved assembly procedure.

First of all, it is possible to get rid of the glue required, in the known solution, to position the ferrite bars on the aluminum base. Accordingly, there is also a decrease of the assembly time of the induction heating device and of the ferrite bars, by replacing the glue with snap-engaging fastener as hooks integral with a central simple component. There is a more accurate positioning of the ferrite bars, with a reduction in position variability caused by the unreliable quantity (and thickness) of the glue, and therefore a better control of the electromagnetic field in the working conditions of the induction heating device. It is also possible to avoid the use of glue required to position the mica layer on the ferrite, with a decrease of connection time of the mica layer by replacing the glue with snap-engaging fasteners.

Last but not least it is possible to easily integrate the temperature sensor holder with a decrease of the number of components, increasing the stability of the sensor holder because it is no longer connected with fasteners, but it is part of a single body.

The invention claimed is:

1. A method for assembling an induction heating device, comprising the steps of:
   interposing at least one ferrite bar between a coil assembly and a support plate;
   snap engaging a central polymeric fastening element on the support plate;
   inserting at least one end of the at least one ferrite bar in at least one radial seat of the central polymeric fastening element, each of the at least one radial seats dimensioned to receive the at least one end of the at least one ferrite bar with a predetermined degree of interference such that the at least one ferrite bar is retained by an interference fit at the radial seats, so that the at least one ferrite bar extends radially from and centered on the central polymeric fastening element;
   snap engaging the coil assembly with the central polymeric fastening element in order to sandwich the at least one ferrite bar between the support plate and the coil assembly.

2. The method according to claim 1, wherein the induction heating device is placed below a glass plate of a cooking appliance in order to obtain an induction cooktop.

3. The method according to claim 1, further comprising interposing a temperature sensor between the central polymeric fastening element and the support plate.

4. The method according to claim 3 wherein the central polymeric fastening element presents a seat for the temperature sensor.

5. The method according to claim 1, further comprising interposing a thermal insulation layer between the coil assembly and the support plate.

6. The method according to claim 5 wherein the thermal insulation layer is mica.

7. The method according to claim 1, further comprising injecting the central polymeric fastening element in a mold with a central portion with a plurality of hook-shaped fastening portions adapted to cooperate with the support plate.

8. The method according to claim 1, wherein the interference fit at the radial seats enables a stable positioning of the at least one ferrite bar relative to the central polymeric fastening element during normal operation of the induction heating device.

9. A method for assembling an induction heating device, comprising the steps of:
   interposing at least one ferrite bar between a coil assembly and a support plate;
   snap engaging a central polymeric fastening element on the support plate;
   inserting at least one end of the at least one ferrite bar in at least one radial seat of the central polymeric fastening element, each of the at least one radial seats dimensioned to stably retain the at least one end of the at least one ferrite bar relative to the central polymeric fastening element with a predetermined degree of interference such that the at least one ferrite bar is retained by an interference fit at the radial seats, so that the at least one ferrite bar extends radially from and centered on the central polymeric fastening element;

snap engaging the coil assembly with the central polymeric fastening element in order to sandwich the at least one ferrite bar between the support plate and the coil assembly.

\* \* \* \* \*